June 13, 1939.  W. H. ASKEW  2,162,048
LOCKING MECHANISM FOR MOTOR VEHICLE DOORS
Filed Jan. 17, 1938  3 Sheets-Sheet 1
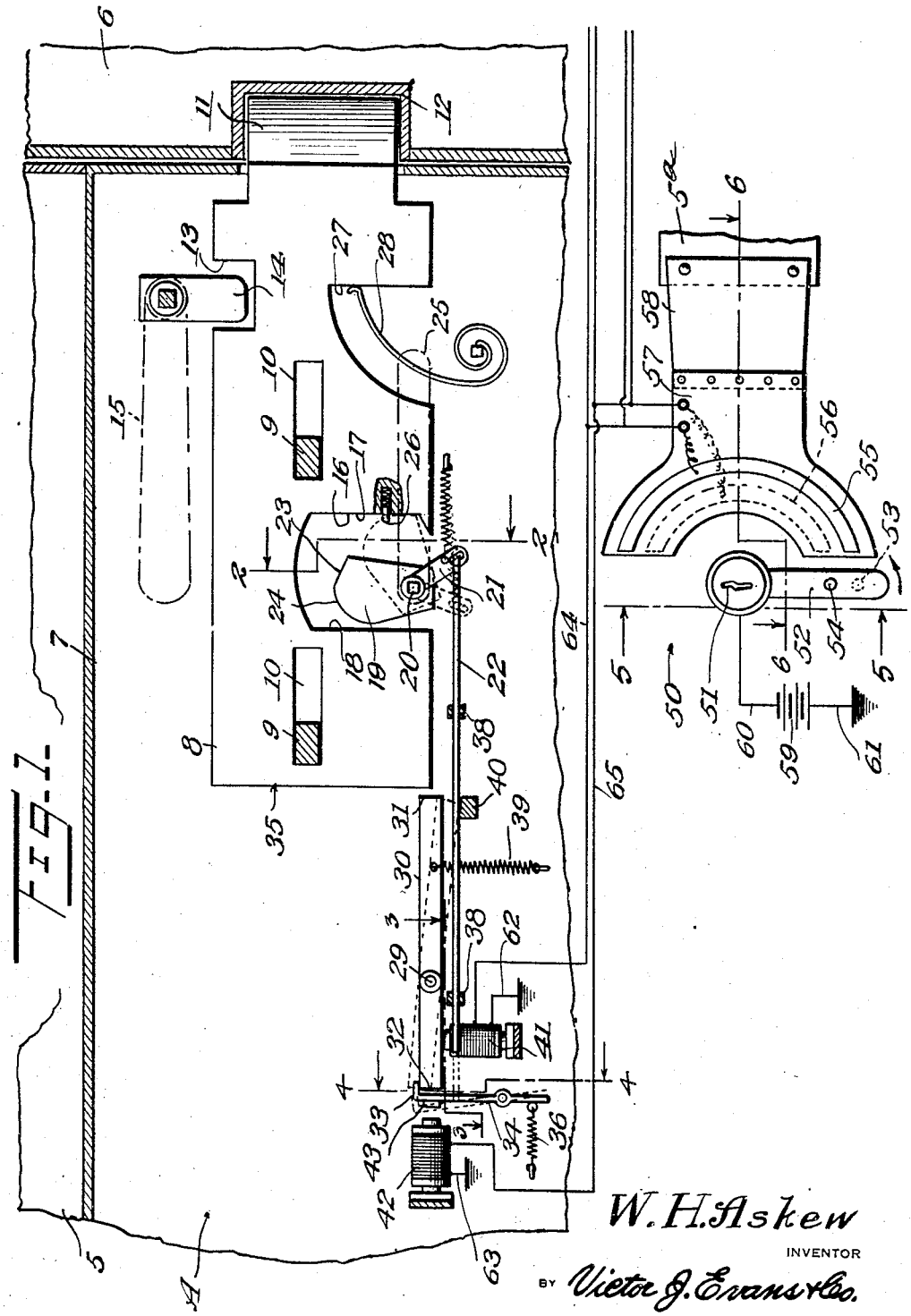
W. H. Askew
INVENTOR
BY Victor J. Evans & Co.
ATTORNEYS

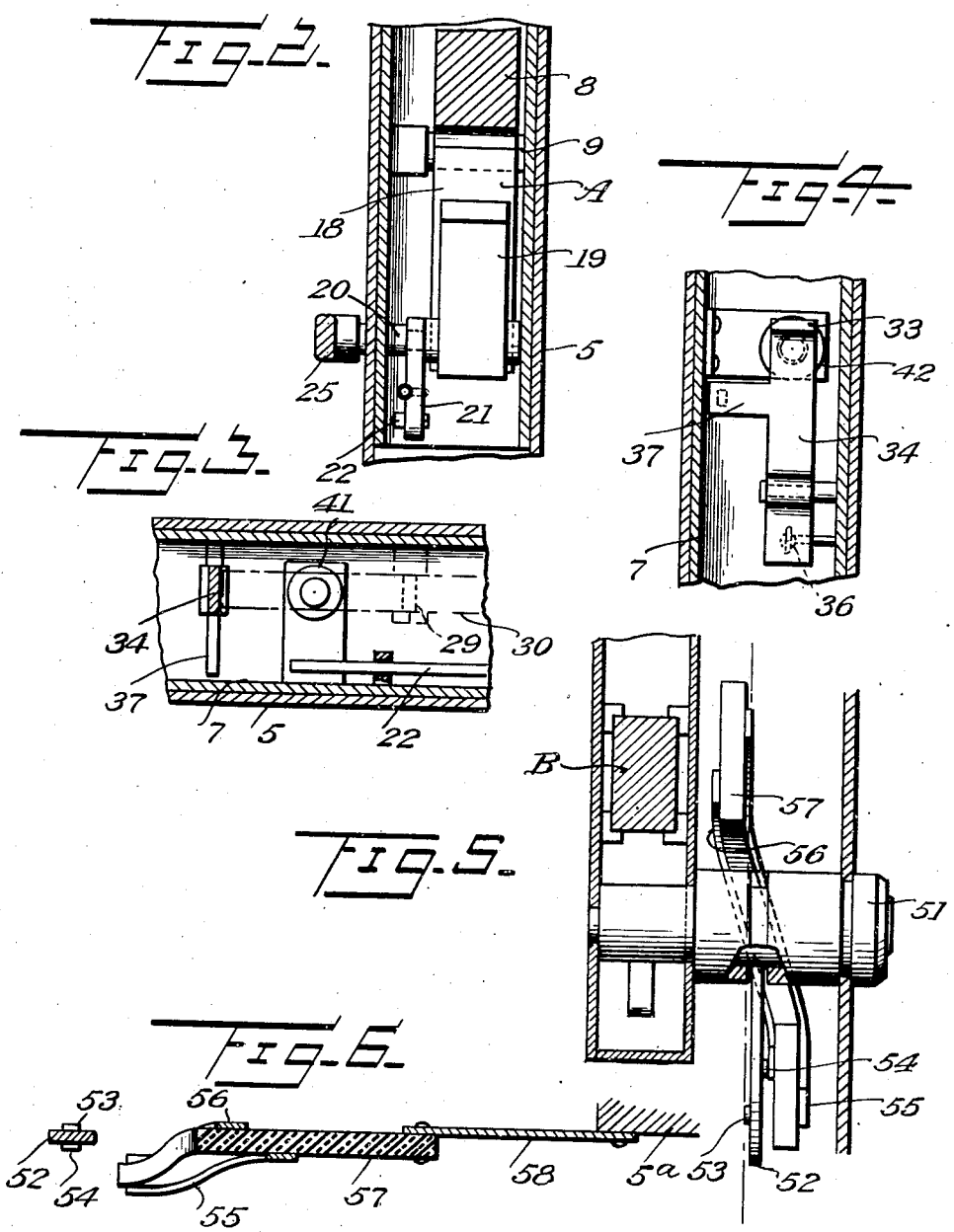

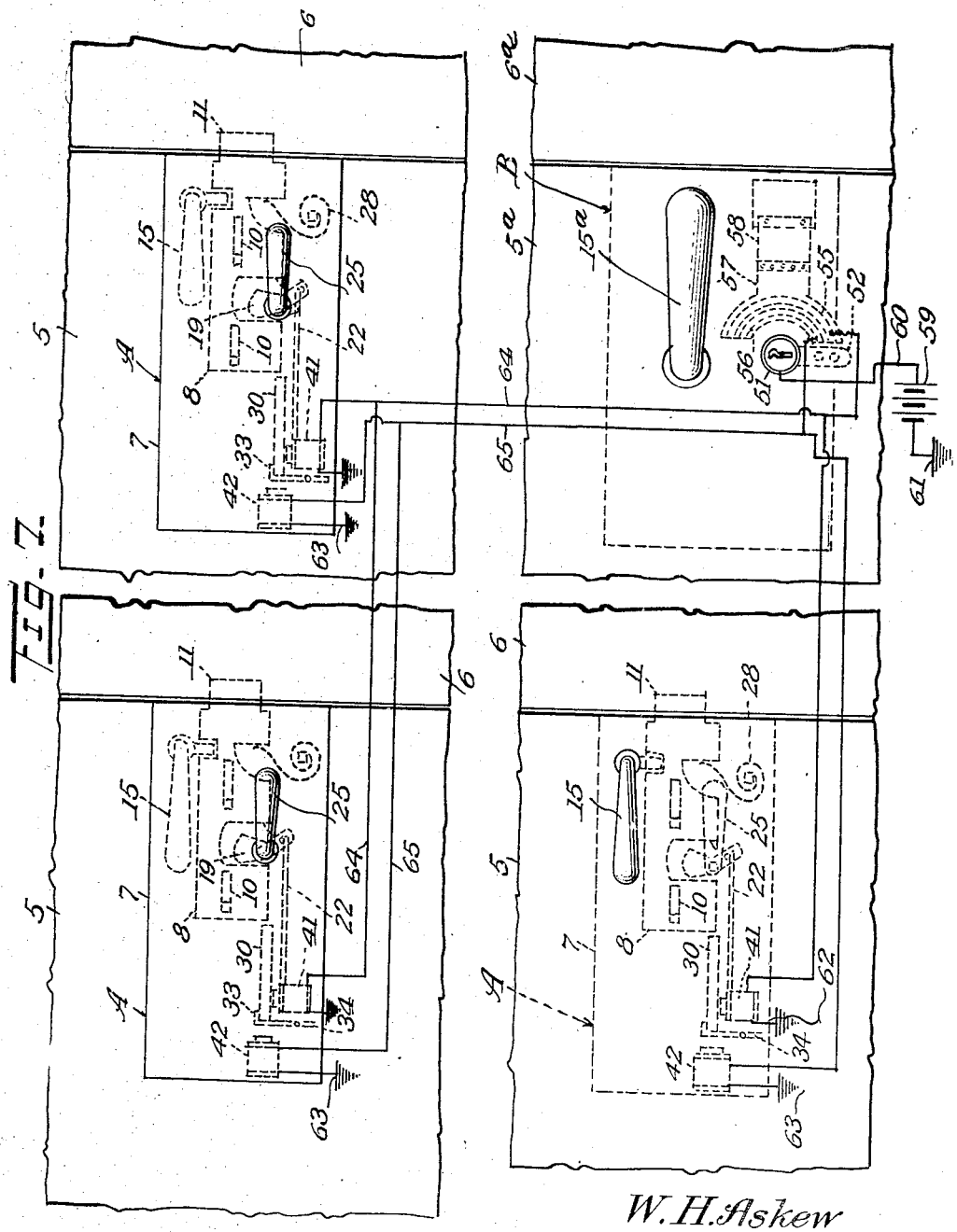

Patented June 13, 1939

2,162,048

UNITED STATES PATENT OFFICE 2,162,048

LOCKING MECHANISM FOR MOTOR VEHICLE DOORS

Wade H. Askew, Mobile, Ala.

Application January 17, 1938, Serial No. 185,442

2 Claims. (Cl. 292—153)

My invention relates to new and improved locking mechanisms for locking the doors of motor vehicles and the like.

In the conventional type of motor vehicle construction all of the doors except one are locked and unlocked individually by devices arranged to be operated manually from inside the vehicle and only from the inside thereof. In this type of construction, the remaining door is arranged to be locked and unlocked from the outside of the vehicle by means of a key operated lock and such locks are oftentimes constructed in a manner that the lock mechanism may be operated from inside the vehicle to unlock and lock the aforesaid remaining door. With the motor vehicle equipped with locking devices for one or more of the doors operable from inside the vehicle to unlock the doors after the vehicle has been locked from the outside thereof, it is possible for a person to neglect to lock one of the doors from inside previous to locking the remaining door from outside thereby permitting a thief or unauthorized person to enter said vehicle by means of said unlocked door.

One of the principal objects of my invention is to improve the construction and mode of operation of the locking mechanisms for locking the doors of a motor vehicle and to produce a locking mechanism which will avoid the disadvantage above referred to in prior locking mechanisms.

Another object of my invention is to produce an improved locking mechanism for simultaneously locking two or more doors of a motor vehicle from outside of said vehicle.

A further object of my invention is to provide an improved locking mechanism for motor vehicles whereby each of the doors may be selectively locked or unlocked from the inside of the vehicle.

A still further object of my invention is to provide a locking mechanism of the above described character which is positive in operation, efficient in use and simple in construction.

Other objects and advantages will be apparent from the following description, appended claims and annexed drawings.

Referring to the drawings wherein like reference characters designate like parts throughout the several views:

Figure 1 is a vertical section through a portion of the body of a motor vehicle illustrating my locking mechanism as applied to one door thereof and further illustrating diagrammatically a switch actuated through the medium of an ordinary form of key lock mechanism on another door, together with the connecting circuit.

Figures 2 to 6 inclusive are sectional views taken on the lines 2—2, 3—3, 4—4, 5—5 and 6—6 of Figure 1, respectively.

Figure 7 is a diagrammatic view illustrating a plurality of motor vehicle doors having my locking mechanisms applied thereto together with the circuit and switch for actuating the same.

In the form of the invention illustrated in the drawings the invention is applied to the body and doors of a motor vehicle, a portion of which is shown including the sections of a door and jamb 5 and 6 respectively of three doors thereof and a section of a door and jamb of a fourth door 5a and 6a respectively. The body is of the usual closed type having the three doors equipped with my improved lock mechanisms A of like constructions and the fourth door equipped with the ordinary type of key operated lock mechanism B.

Inasmuch as the lock mechanisms A of each of the three doors are of an identical construction, a detailed description of one such mechanism will suffice, it being understood, for the purpose of description, that the reference numerals indicative of parts of one mechanism are indicative of like parts of the other mechanisms.

The lock mechanism A comprises a housing having in the upper section 7 thereof a sliding bolt 8. Said housing is provided with transversely extending lugs 9 operable within elongated slots 10 formed in the bolt whereby to limit the retraction and projection of said bolt within the housing. The bolt is fashioned with an inclined end section 11 at one end thereof for engagement within a keeper 12 secured within the jamb 6. The upper section of said bolt is provided with a slot 13 in which is positioned one end of an actuating arm 14 pivotally mounted within said housing and having a handle 15 connected thereto on the outside of said door whereby to manually actuate the bolt to retracted position from outside of the motor vehicle.

The lower section of the bolt is fashioned with a transversely extending channel 16 having side walls 17 and 18 between which is positioned an elongated manually operable latching member 19 having one end fixed on a shaft 20 journaled for rotation in the front and rear walls of the housing. An actuating arm 21 is also fixed to the shaft and depends therefrom and is slidably connected to one end of an actuating rod 22 for a purpose hereinafter described. The opposite end of the member 19 is formed with flat and arcuate faces 23 and 24 respectively for engagement with the walls 17 and 18 respectively. The inner end of the shaft 20 extends within the motor vehicle and has secured thereon adjacent the inner face of the door a handle 25 whereby the member 19 may be moved in one direction for engaging the face 23 with the wall 17 to prevent retraction of the bolt by the handle 15 and in the opposite direction to permit the arcuate face 24 to engage the wall 18 for camming the bolt into retracted position independent of actuation by the handle 15 whereby to lock and unlock said door respectively. The lower end of the wall 17 is fashioned with an inwardly extending section to limit the downward movement of the member 19. Adjacent said extending section there is provided a spring actuated retaining member 26 for engagement with the member 19 for yieldably maintaining the same in engagement with the wall 17 to prevent accidental dislodgement therefrom. Intermediate of the channel 16 and section 11, the bolt is segmented to form a transverse face 27 engageable by the end of a spring 28 mounted within said housing for normally maintaining said bolt in projected position.

Within the housing, adjacent the rear end of the bolt 8, there is secured a transversely extending shaft 29 on which is pivoted a locking member 30 having front and rear end sections 31 and 32 respectively. The rear end section 32 is engaged by an offset section 33 formed on the upper end of an arm 34 pivotally mounted within the housing. The section 33 serves to maintain the arm 30 in a position whereby the rear face 35 of the bolt engages the front end section 31 to prevent actuation of the bolt to retracted position as illustrated in Figure 1 of the drawings.

The lower end of the arm 34 is connected to one end of a spring 36 secured to the housing and said spring serves to urge the upper end of the arm 34 towards the rear end of the arm 30. The arm 34 is pivoted intermediate the ends thereof and fashioned with a laterally extending lug 37, between said pivot and upper end, for engagement with the rear end of the rod 22. The rod 22 is slidably mounted in bearing members 38 secured to the housing and is adapted to be actuated into and out of engagement with the lug 37 by movement of the arm 21 carried by the shaft 20.

The front end section 31 of the arm 30 is secured to a subjacently extending spring 39 connected to the housing. Said spring serves to urge said section 31 downwardly against a stop member 40 extending transversely within said housing and out of the path of said bolt when actuated to retracted position.

An electro-magnet 41 is secured within the housing subjacent the rear section 32 of the arm 30 and when energized serves to move said section downwardly and position the front end section of the arm 30 in the path of the bolt to prevent actuation of said bolt to retracted position. When the section 32 of the arm 30 is moved downwardly under the influence of the electromagnet 41, the spring 36 serves to move the section 33 of the arm 34 over the upper face of the arm 30 and maintain the section 32 of the arm in a downward position against the tension of the spring 39 thus maintaining the arm in position for engagement with the face of the bolt 35 to prevent retraction thereof through the medium of the handle 15 and connected parts.

An electro-magnet 42, similar in construction to the electro-magnet 41, is located rearwardly of the end section 32 of the arm 30, the upper end of the arm 34 being interposed. The upper end of the arm 34, on the rear face thereof, is fashioned with a contact 43 whereby, upon energization of the electro-magnet 42, the upper end of the arm 34 is actuated towards said magnet and releases the rear section 32 of the arm 30 causing the front section 31 thereof to pivot downwardly under the influence of the spring 39 out of the path of the bolt 8 when moved to retracted position.

The foregoing is descriptive of the locking mechanism A secured to one of the doors and the same is connected with like mechanisms secured to the other doors 5 by electrical means whereby the same may be operated in a desired order.

Secured to the ordinary lock mechanism B on the door 5a is a switch mechanism 50 comprising the usual lock cylinder 51 fashioned with a depending switch arm 52 operable within a circumferentially extending slot in the barrel of said lock. Said lock cylinder is adapted to be actuated through the medium of a key (not shown) insertable therein from the outside of the door. The lock mechanism B is of the typical construction having the usual inside operating handle (not shown) and the usual outside handle 15a.

The inner and outer faces of the switch arm 52 are each provided with a contact 53 and 54 respectively for engagement with spaced contact plates 55 and 56 respectively secured to opposite faces of an insulated arm 57 attached to the door 5a by means of a yieldable connecting plate 58 as clearly illustrated in Figures 1, 5 and 6.

The contact plates 55 and 56 are of an arcuate configuration and located concentrically of the barrel 51 whereby rotation of the arm 52 serves to cause one of the contacts 53 or 54 to engage therewith as hereinafter described. As illustrated in Figure 5, the contact plates 55 and 56 and arm 57 are inflected intermediate of the ends thereof whereby rotation of the switch arm 52 in a counterclockwise direction as indicated by the arrow in Figure 1 will cause the contact 54 to engage contact plate 56 for effecting energization of the electro-magnet 42. Rotation of the arm 52 in an opposite direction will cause contact 53 to engage contact plate 55 to effect energization of the electro-magnet 41.

The switch arm and cylinder 51 are connected to one terminal of the motor vehicle battery 59 by means of an electrical connection 60, while the other terminal of said battery is grounded to the frame of the vehicle by means of a connection 61, it being understood that the switch arm and cylinder are insulated from the door frame. Each of the electro-magnets 41 and 42 are grounded to the frame of the vehicle by electric connections 62 and 63 respectively. The electro-magnets 41 on each door are connected to the contact plate 55 by electrical wiring 64 and likewise each of the electro-magnets 42 are connected to the contact plate 56 by electrical wiring 65.

In operation, with particular reference to Figure 1 of the drawings, the lock mechanisms A on each of the doors of the motor vehicle being in unlocked condition, the member 19 being out of engagement with the walls 17 and 18 of the channel, the switch arm is rotated clockwise to effect connection between the contact 53 and plate 55 to cause energization of the electromagnet 41. When the electromagnet 41 is energized, the front end section 31 of the arm 30 is pivoted upwardly against the tension of the spring 39 and the section 33 of the arm 34 engaged over the end 32 by the action of the spring 36 thereby positioning the front end of the arm 30 in the path of the bolt 8 as clearly illustrated in full lines in Figure 1. In this position of the parts, all of the lock mechanisms A are in locked condition to prevent an opening of any of the doors 5 except by actuation of the switch arm 52 from without the motor vehicle or actuation of the individual handles 25 within the vehicle.

Actuation of the switch arm 52 in a reverse direction causes the contact 54 to engage the plate 56 and close the circuit from the battery to energize electro-magnet 42. Upon energization of the electro-magnet 42 the arm 34 is attracted thereto and thus moved from engagement with the rear section 32 of the arm 30 thereby permitting the front end thereof to pivot downwardly out of the path of the bolt 8, thus simultaneously effecting unlocking of all of the lock mechanisms A.

When the lock mechanisms A have been placed in a locked condition, as illustrated in full lines in Figure 1, the lock mechanisms A may be selectively actuated to unlocked positions by the handles 25 through the medium of the rear end of the rod 22—which is pivoted to the arm 21—engaging the front face of the arm 34 and effecting disengagement of the latter from the rear section 32 of the arm 30.

From the foregoing it will be apparent that while each of the lock mechanisms A and B may be individually locked from within the motor vehicle, all of said mechanisms may be simultaneously locked from without the motor vehicle by actuation of the switch arm 52 and cylinder 51. In instances where one or more of the lock mechanisms A have been locked by actuation of the handles 25 from within the motor vehicle, the remaining mechanisms may be locked from without the motor vehicle, by the said actuation of the arm 52 and the cylinder 51.

What I claim is:

1. A lock structure, comprising, a housing formed with a pair of spaced walls, a bolt slidably mounted in said housing and operable to projected and retracted positions, outside and inside bolt actuating members rotatably mounted on and extending through said walls respectively and connectable with said bolt for independently operating the latter to retracted position, said inside member operable to a latched position to maintain said bolt in projected position, a latch device carried in said housing and operable for latching said bolt in projected position when the latter is in retractible condition, said latch device responsive to movement of said inside member when the latter is actuated to maintain said bolt in projected position whereby to retractibly condition said bolt relative to said latch device for actaution to retracted position by said inside member and by said outside member upon actuation of said inside member from latched position.

2. A lock structure, comprising, a housing formed with a pair of spaced walls, a bolt slidably mounted in said housing and operable to projected and retracted positions, outside and inside bolt actuating members rotatably mounted on and extending through said walls respectively and connectable with said bolt for independently operating the latter to retracted position, said inside member having a cam operable to a latched position to maintain said bolt in projected position, a latch device carried in said housing and operable for latching said bolt in projected position when the latter is in retractible condition, said latch device having a spring pressed arm responsive to movement of said cam when the latter is actuated to maintain said bolt in projected position whereby said device is operated to retractibly condition said bolt relative to said device for actuation to retracted position by said cam and by either of said inside and outside members upon movement of said cam from latched position.

WADE H. ASKEW.